United States Patent
Sundaram et al.

(10) Patent No.: US 11,935,185 B2
(45) Date of Patent: Mar. 19, 2024

(54) CONTENT BASED ANTI-ALIASING FOR IMAGE DOWNSCALE

(71) Applicant: INTEL CORPORATION, Santa Clara, CA (US)

(72) Inventors: Vijay Sundaram, San Jose, CA (US); Yi-Jen Chiu, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 679 days.

(21) Appl. No.: 16/822,649

(22) Filed: Mar. 18, 2020

(65) Prior Publication Data
US 2020/0226822 A1 Jul. 16, 2020

(51) Int. Cl.
*G06T 15/50* (2011.01)
*G06T 3/40* (2006.01)
*G06T 5/00* (2006.01)
*G06T 5/20* (2006.01)
*G06T 7/13* (2017.01)

(52) U.S. Cl.
CPC ............. *G06T 15/503* (2013.01); *G06T 3/40* (2013.01); *G06T 5/003* (2013.01); *G06T 5/20* (2013.01); *G06T 7/13* (2017.01)

(58) Field of Classification Search
None
See application file for complete search history.

(56) References Cited

U.S. PATENT DOCUMENTS

| | | | | |
|---|---|---|---|---|
| 6,556,311 B1* | 4/2003 | Benear | .................... | G06T 3/403 358/1.9 |
| 2005/0219249 A1* | 10/2005 | Xie | ......................... | G06T 15/503 345/473 |
| 2009/0148059 A1* | 6/2009 | Matsuda | ................. | G06T 9/008 382/251 |
| 2010/0135588 A1* | 6/2010 | Au | .......................... | G06T 3/403 382/243 |
| 2011/0235906 A1* | 9/2011 | Hashimoto | ............. | G06T 5/005 382/199 |
| 2013/0301933 A1* | 11/2013 | Salvador | ............... | G06T 3/4053 382/263 |
| 2020/0219229 A1* | 7/2020 | Sundaram | ............. | G06T 7/0002 |

OTHER PUBLICATIONS

European Patent Office, "Extended European Search Report," mailed in connection with European Patent Application No. 20213773.3, dated May 25, 2021, 13 pages.

(Continued)

*Primary Examiner* — Randolph I Chu
(74) *Attorney, Agent, or Firm* — Hanley, Flight & Zimmerman, LLC

(57) ABSTRACT

An apparatus for content based anti-aliasing is described herein. The apparatus comprises a detector, corrector, and downscaler. The detector is to detect potential aliased content in an input image, wherein the potentially aliased content occurs at a downscaled version of the input image. The corrector is to apply a correction to a single component of the input image. A downscaler may downscale the corrected input image to an output image according to a scaling factor.

24 Claims, 9 Drawing Sheets

(56) References Cited

OTHER PUBLICATIONS

Sankaralingam et al., "PAA: Perception Based Anti-Aliasing for High Quality Transformed Image Reconstruction from Single Image," ACM, Proceedings of the 2nd International Conference on Perception and Machine Intelligence, Feb. 26, 2015, 9 pages.

Sankaralingam et al., "Designing a Perception Based Anti-aliasing Filter for Enhancement of Down-sampled Images," 4th International Conference on Signal and Image Processing, 2012, 2 pages (abstract).

Lazarowitz et al., "Edge Anti-aliasing Algorithms Based on Morphological Operators," IEEE, International Conference on Consumer Electronics, Jan. 8, 2005, 2 pages.

Fang et al., "A New Adaptive Subpixel-based Downsampling Scheme Using Edge Detection," IEEE, International Symposium on Circuits and Systems, May 24, 2009, 4 pages.

European Patent Office, "Communication under Rule 71(3) EPC," mailed in connection with European Patent Application No. 20213773.3, dated Jan. 26, 2024, 37 pages.

* cited by examiner

100

| | | |
|---|---|---|
| Up-Right | Up | Up-Left |
| Right | Center | Left |
| Down-Right | Down | Down-Left |

| -1 | 0 | 1 |
|---|---|---|
| -2 | 0 | 2 |
| -1 | 0 | 1 |

Horizontal
304

| 1 | 2 | 1 |
|---|---|---|
| 0 | 0 | 0 |
| -1 | -2 | -1 |

Vertical
302

| 0 | 1 | 2 |
|---|---|---|
| -1 | 0 | 1 |
| -2 | -1 | 0 |

45 Degrees
306

| 2 | 1 | 0 |
|---|---|---|
| 1 | 0 | -1 |
| 0 | -1 | -2 |

135 Degrees
308

|   |   |   |
|---|---|---|
| 1 | 2 | 1 |
| 2 | 4 | 2 |
| 1 | 2 | 1 |

| 1 | 4 | 6 | 4 | 1 |
|---|---|---|---|---|

CONTENT BASED ANTI-ALIASING FOR IMAGE DOWNSCALE

BACKGROUND

Image content is rendered using pixels, which represent the smallest renderable unit of the input image as captured by an image capture mechanism. In various applications, an image may be scaled by sampling the content of the image at various pixels throughout the image and calculating a color value for pixels of the desired re-scaled image. The resulting image may include undesirable distortions and artifacts, also known as aliasing.

BRIEF DESCRIPTION OF THE DRAWINGS

FIG. 2B is an illustration of neighboring pixels;

FIG. 3 is an illustration of 3×3 Sobel matrices;

FIG. 4A is an illustration of a 3×3 Gaussian blur matrix applied during correction;

FIG. 4B is an illustration of a one dimensional 5-tap anti-aliasing filter applied during correction;

The same numbers are used throughout the disclosure and the figures to reference like components and features. Numbers in the 100 series refer to features originally found in FIG. 1; numbers in the 200 series refer to features originally found in FIG. 2A-B; and so on.

DESCRIPTION OF THE EMBODIMENTS

Figure 1:
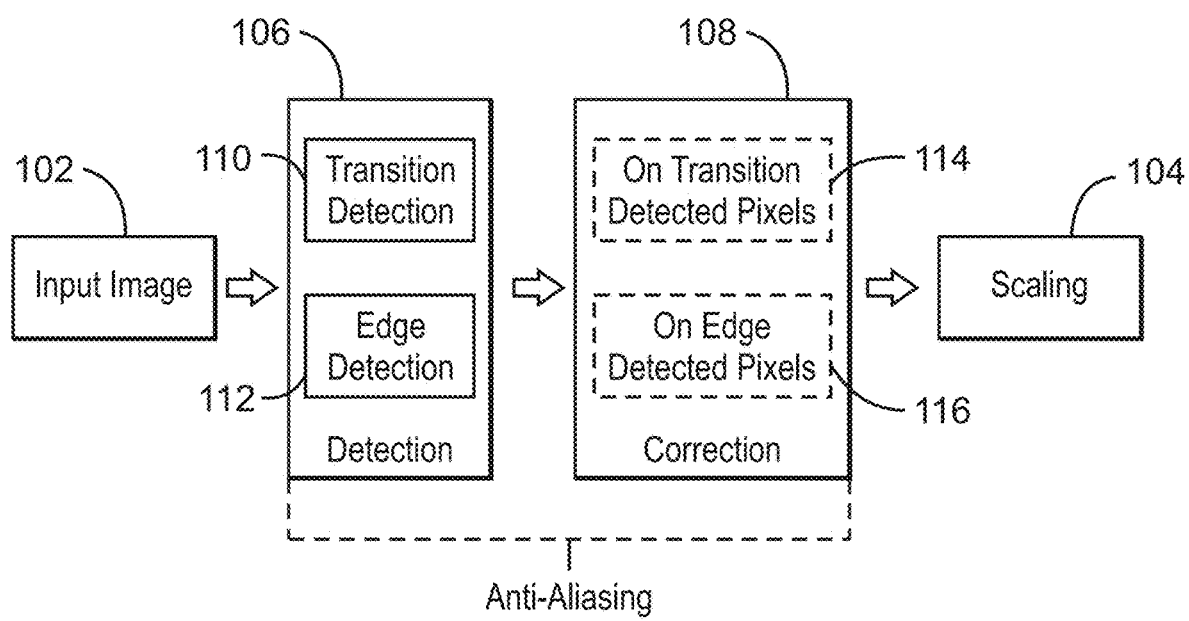
FIG. 1 is a block diagram of anti-aliasing according to the present techniques.

A variety of applications may require image scaling, which can include image upscaling and image downscaling. Image upscaling may increase a size of the input image, while image downscaling may decrease the size of the input image. Generally, image upscaling is accomplished using a reconstruction filter. Image downscaling is typically accomplished by downsampling a smaller output image from a higher-resolution input image. Often, an anti-aliasing filter is applied to an input image prior to a signal sampler to restrict the bandwidth of a signal to approximately or completely satisfy the Nyquist-Shannon sampling theorem over the band of interest. Downscaling of images may introduce aliasing in the downscaled output image. Aliasing causes neighboring pixels to become similar to, or aliases of, each other when sampled. Visually, aliasing may be discovered by jagged, rough, pixelated edges displayed in an image.

Aliasing is a common problem and is seen as visual artifacts in downscaled images. When downscaling by more than twice the input image size, there is possible loss of data due to Nyquist constraints. As used herein, the Nyquist constraints generally refer to the Nyquist-Shannon sampling theorem which states that for a full and accurate reproduction of a signal, the sampling frequency should be greater than twice the maximum frequency in the original signal. Generally, an anti-aliasing filter limits the bandwidth of a signal to satisfy the Nyquist constraints prior to downsampling the image. Even when a general band limiting anti-aliasing filter is used on all pixels, aliasing is seen as artifacts in the following three categories: moiré effects in repeating patterns, staircase effects across angled edges, and a loss of edge details in strong directional content.

The present techniques enable content based anti-aliasing for image downscale. In embodiments, an image downscale quality is enhanced by executing content based anti-aliasing, which improves the visual quality of the output image significantly in addition to being hardware efficient and simple. Content is detected in the input image that could be potentially aliased in the downscaled resolution. After the potentially aliased content is identified, an appropriate correction is applied to pixels of the input image corresponding to the potentially aliased content. The anti-aliasing correction as described herein is applied pre-scaling, for one-time, to the input image. The correction is applied to only the luma component of the image.

Generally, an image is represented electronically according to a particular color space. The color space identifies a particular format of colors so that the colors can be reproduced. In a color space, a luma value or component may be used to represent the brightness of an image, while a chroma value or component represents the color information. The present techniques eliminate moiré effects, staircase effects, and a loss of edge details based on the particular content of the input image by correcting luma information. The present techniques are not limited to a general reduction in frequencies as is a typical anti-aliasing filter applied to all pixels of an input image. In embodiments, the present techniques identify the particular areas of aliasing as a function of the scale factor and improve the visual quality of those areas.

Through the content based anti-aliasing for image downscaling described herein, the output visual quality on downscaled images greater than twice the size of the input image is significantly improved, with no aliasing and better edge preservation. These are specially more perceivable in cases of large downscale scenarios. Moreover, the present techniques can be implemented with a relatively small number of gates and support real-time anti-aliasing, providing a good trade-off of quality with hardware complexity.

FIG. 1 is a block diagram of anti-aliasing 100 according to the present techniques. As illustrated, an input image 102 is input to the anti-aliasing 100 processing. After the input image 102 is anti-aliased, the output may be further scaled at scaling 104. The present techniques enable spatial anti-aliasing as a pre-processing component of image downscaling. In embodiments, prior to the general, traditional application of an anti-aliasing filter and subsequent downsampling at scaling 104, the present techniques firstly detect areas of potential aliasing and then secondly apply a correction appropriate to each particular area of potential aliasing. The proposed anti-aliasing solution is applied to the input image and is applied pre-scaling to the input image. The present techniques detect and correct only the luma component of the image.

Anti-aliasing 100 according to the present techniques includes detection 106 and correction 108. In the detection 106, transition detection 110 and edge detection 112 are performed. In the correction 108, correction is applied on-transition detected pixels 114 and on edge detected pixels 116. Generally, in detection 106, the scale factor between the input image and the output image is used to identify potential pixels which could be aliased from the input image as described below. Additionally, during detection 106 strong directional content is identified in the image. In embodiments, strong directional content occurs in areas where there is a correlation of pixels in a specific direction. Accordingly, a pixel has strong directional content in a particular direction when other neighboring pixels exhibit the same directional content, creating a directional correlation across a group of pixels. At correction 108, for each detected pixel locations corresponding to a potential area of aliasing, a gaussian blur or a directional anti-aliasing filter is applied as appropriate according to the type of aliasing.

Potential areas of aliasing may be areas of the image that exhibit moiré effects in repeating patterns, staircase effects across angled edges, and a loss of edge details in strong directional content. Transition detection 110 and edge detection 112 can be used to detect the features of the image that may cause moiré effects in repeating patterns, staircase effects across angled edges, and a loss of edge details in strong directional content in the output downscaled image. During correction 108, pixels are corrected based on the particular defect detected. Correction on transition detected pixels 114 may be done by applying a gaussian blur. Correction on edge detected pixels 116 may be done by applying a directional anti-aliasing filter.

In this manner, the present techniques enable a pre-processing anti-aliasing solution with no multi-sampling. Traditionally, spatial anti-aliasing (AA) solutions such as Fast Approximate Anti-Aliasing (FXAA), Subpixel Morphological Anti-Aliasing (SMAA), Super Sampling Anti-Aliasing (SSAA), and Multi-Sample Anti-Aliasing (MSAA) are post-processing based anti-aliasing or are based on multi-sampling. Most traditional solutions result in a high computing complexity that makes real-time video processing unattainable. Moreover, since some of these solutions are post-processing the final output image, they introduce image blurring on the downscaled output and the overall contrast of the image deteriorates.

Figure 2A:
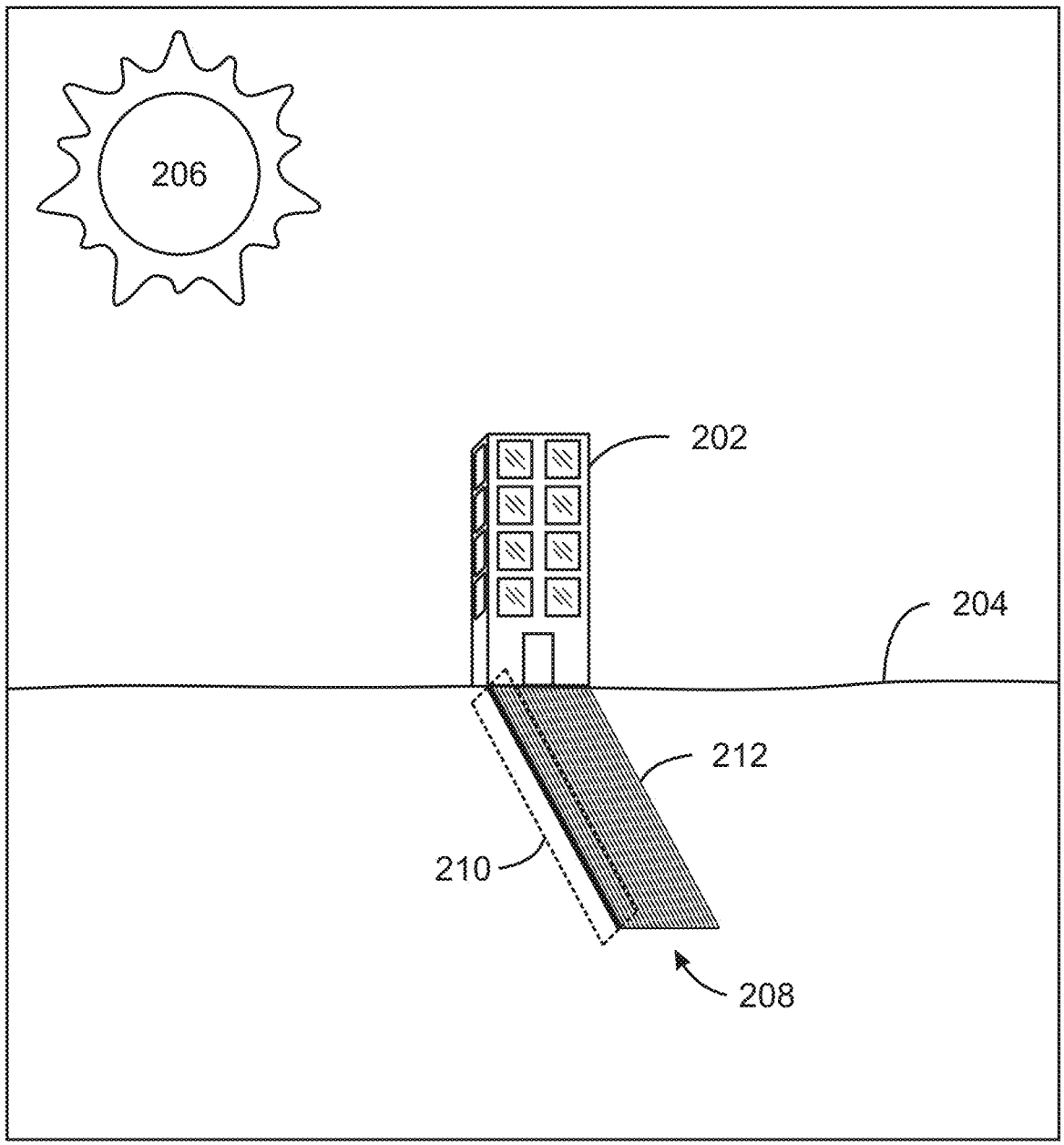
FIG. 2A is an input image with a transition and an edge according to the present techniques.

FIG. 2A is an input image 200A with a transition and an edge according to the present techniques. FIG. 2A is an exemplary illustration of transitions and edges and should not be viewed as limiting on the present techniques. Edges and transitions can occur in an image or video with any number of locations, orientations, and directions. In the example of FIG. 2A, a building 202 may be located on the ground 206 under the light source or sun 206. The sun 206 causes a shadow 208 to be cast of the building 202. In the input image 200A, at or near the shadow 208, a transition 210 and edge 212 occurs.

A transition 210 of interest may be defined as a direction change in luminance or a strong intensity change in luminance across neighboring pixels. In embodiments, a transition is found by computing gradients across a neighborhood of pixels and identifying areas with strong intensity changes. These areas are referred to as transitions. In embodiments, the number of neighboring pixels in a neighborhood is eight or more. Additionally, in embodiments, the value of N is dependent upon the scale factor. In embodiments, the value of N is greater than the scale factor in order to accurately detect transitions. For example, if the input image in downscaled by a factor of 4, a neighborhood of pixels includes at least 4 pixels.

FIG. 2B is an illustration of neighboring pixels 200B. In some cases, the center pixel is referred to as the current pixel. The remaining pixels are referred to as up-right, up, up-left, right, left, down-right, down, down-left with respect to their position relative to the center. The pixels may have additional attributes, such as a magnitude and direction. In embodiments, the direction of a pixel may be vertical or horizontal. The direction of the edge may be based on local deltas between the current pixel and the eight neighboring pixels (up-right, up, up-left, right, left, down-right, down, down-left). Directional content of a pixel, as used herein, refers to a variation in the orientation of features detected at each particular pixel, such as an edge, line, or texture.

For every pixel in the input image, transitions are detected in both vertical and horizontal directions using a neighborhood of N×1 pixels. Transitions 210 of interest are defined as a direction changes in luminance or a strong intensity changes across pixels. Luminance (luma), as used herein, refers to the brightness representation associated with various color spaces. For example, the YUV color space is defined by one luma component (Y) and two chrominance components, referred to as a blue projection (U) and a red projection (V). As described below, the present techniques correct the luma components of an input image, while the chroma components are unchanged.

Immediate pixel differences are computed for the neighborhood of N pixels. An immediate pixel difference as used herein in a change in luma values between immediate/adjacent pairs of pixels in a particular direction. For a neighborhood of N pixels, there are N−1 pixel differences. A pixel difference may be calculated as follows:

$$PixelDiff_{i,i+1} = Pixel_i - Pixel_{i+1}$$

The pixel difference may also be a computed gradient. If the absolute value of the immediate pixel difference is greater than an intensity threshold, a transition exists between the pair of immediate/adjacent pixels for the particular direction. Accordingly, satisfying the following equation indicates a transition in the neighborhood:

$$|PixelDiff_{i,i+1}| > \text{Intensity Threshold}$$

As used herein, the intensity threshold may be programmable and experimentally identifiable based on the particular in question. In embodiments, if there is a change in sign (+ve to −ve or −ve to +ve) across consecutive pixel differences, the areas with the consecutive pixel differences is a transition.

For each neighborhood of pixels where one or more transitions were detected, an edge count is determined in each pixel direction. The edge count is calculated on a per-neighborhood basis based on a scale factor. In embodiments, the scale factor may be different according to the direction associated with each pixel.

$$EdgeCountVert = \frac{N}{ScaleFactorVert + 0.5}$$

$$EdgeCountHoriz = \frac{N}{ScaleFactorHoriz + 0.5}$$

The scale factor is a ratio between the input image and the target image. Each of EdgeCountVert and EdgeCountHoriz defines the allowed number of transitions for the neighborhood of pixels considered. If the number of transitions computed in the direction are greater than the respective edge count, the pixel is marked as potentially aliased. In embodiments, to handle subtle luminance differences in highly correlated regions, a comparison of luma values is made against a low threshold. The thresholds used herein may be programmable and experimentally identifiable based on the content in question. If $|PixelDiff_{i,i+1}| < PixelLow$ Threshold, the current pixel difference is ignored and processing continues to evaluating the next immediate pixel difference of the neighborhood. If no additional pixel differences remain, transition detection for the neighborhood is complete. This results in ignoring unreal transitions in highly correlated regions.

At edge detection 110, edge detection is performed on pixels that were not classified as an aliased pixel during transition detection 110. In embodiments, an edge 212 may be a boundary or contour that separates adjacent image regions having relatively distinct characteristics according to some image feature. For example, an edge pixel may be a pixel location where an abrupt change in luma occurs. A transition, such as those detected by the transition detection 110 may include an edge. However, transition pixels have been previously identified as aliased and will not be subjected to edge detection.

During edge detection, if the current pixel is not detected as a "potentially aliased pixel" during transition detection 110, then edge detection 112 is performed. Edge detection detects strong directional content in order to ensure an improved edge preservation in the downscaled outputs.

FIG. 3 is an illustration of 3×3 Sobel matrices 300. Edge detection is performed using 3×3 Sobel Matrices and in K different directions for four possible angles Vertical 302, Horizontal 304, 45 degrees 306, and one-hundred thirty five degrees 308. During edge detection, for every pixel which is not an aliased pixel, the 3×3 neighborhood of input pixels is convolved with each of the four Sobel matrices 300 to compute four resulting Sobel values.

For the four resulting Sobel values, the Sobel values are compared and the direction (amongst K directions) with maximum value/distortion is identified. In embodiments, K specifies the number of directions for which edge detection is performed. If the Sobel value is greater than a programmable EdgeThreshold, the pixel location corresponding to this Sobel value is marked with the winning direction, where the winning direction is selected on a per neighborhood basis. The winning direction is to indicate the direction across the input pixels which the 1D 5-tap anti-aliasing filter will be applied to as described with respect to FIG. 4B.

Figures 4A, 4B:
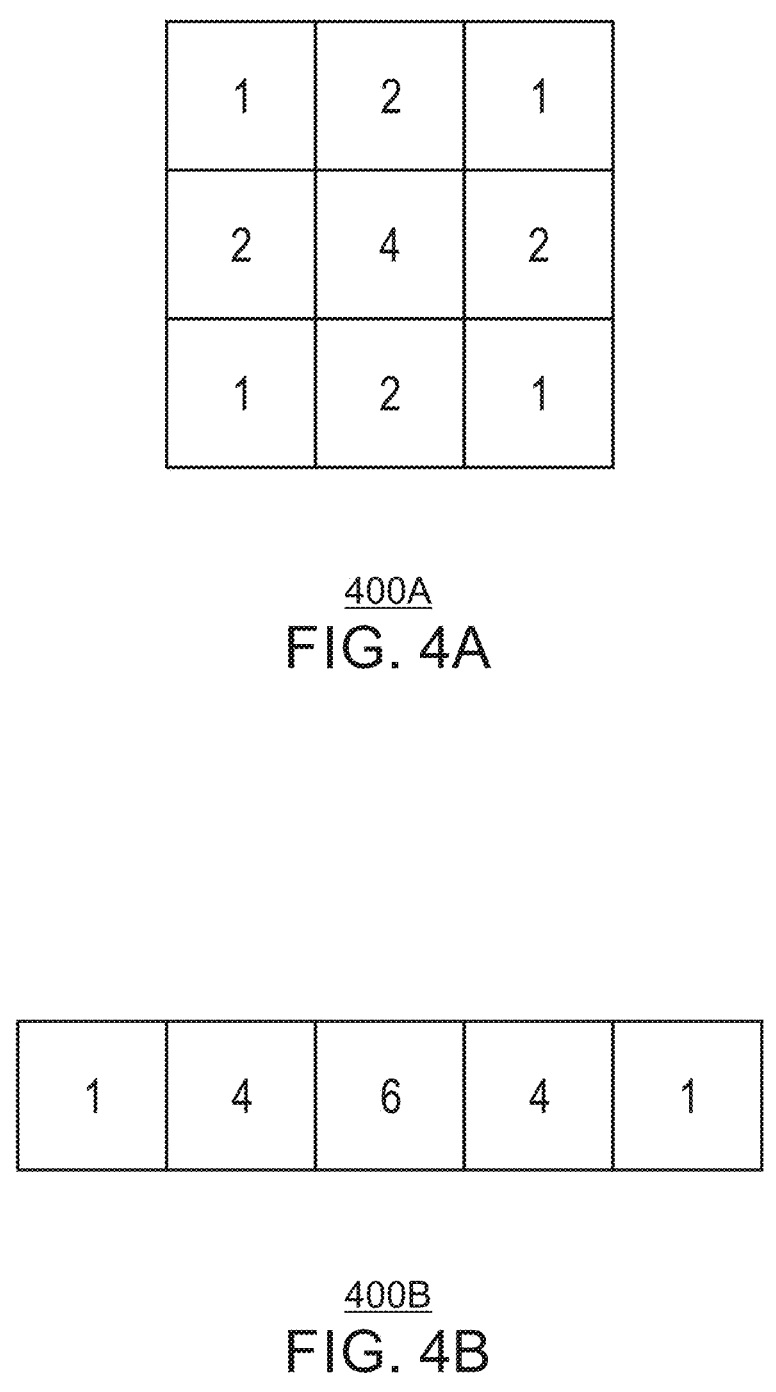

FIG. 4A is an illustration of a 3×3 Gaussian blur matrix 400A applied during correction, and FIG. 4B is an illustration of a one dimensional (1 D) 5-tap anti-aliasing filter 400B applied during correction. Two forms of correction are applied to the aliased pixels, and the particular correction applied is based on the type of detection as discussed above. The two forms of correction include one for the transition detected pixels and the other for the edge detected pixels. For the pixels marked as aliased as a result of transition detection (such as transition detection 110) in either Vertical/Horizontal directions, a 3×3 Gaussian blur convolution is applied to those pixels to replace the current/center pixel value with the convolution output. For marked as potentially aliased as a result of edge detection 112, across the K different angles, a directional 1D 5-tap anti-aliasing filter 400B is applied perpendicular to the direction of the identified winning edge. In embodiments, the hardware associated with the corrections described herein can be implemented with logical shifts and adds, and logical multipliers.

Figure 5A:
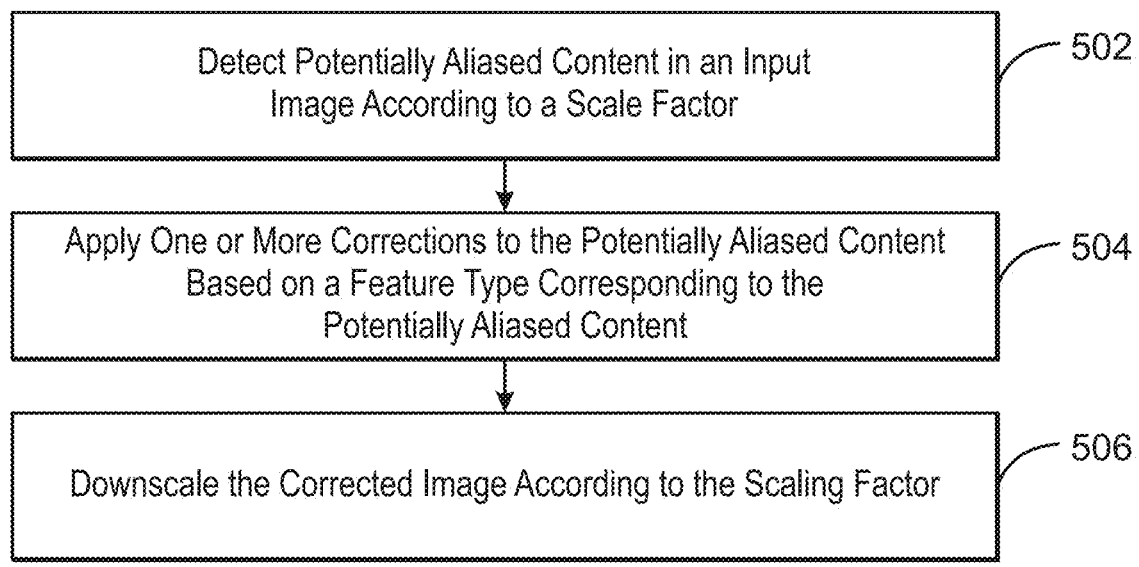
FIG. 5A is a process flow diagram of a method for content based anti-aliasing for image downscale.

FIG. 5A is a process flow diagram of a method 500A for content based anti-aliasing for image downscale. The method 500A may be implemented in the computing device 600 of FIG. 6 below, or the computer readable medium 700 of FIG. 7 below.

At block 502, potentially aliased content is detected in an input image. The detection of potentially aliased content may be based, in part on a scale factor. As used herein, the scale factor is a ratio between an original input image size and a scaled target image size. For example, an image may be downscaled by a factor of two. In this example, the target image is half the size of the input image. In embodiments, the detection of a feature, such as a transition, is based on the scale factor. Moreover, the detection of an edge may be done according to the scale factor. In this manner, the anti-aliasing is applied to the input image content, enabling a content-based image downscale.

At block 504, one or more corrections is applied to the potentially aliased content of the input image based on a feature type corresponding to the potentially aliased content. In embodiments, a feature type associated with the potentially aliased content may be a transition or an image. If the feature type associated with the potentially aliased content is a transition, a Gaussian blur convolution is performed. A Gaussian blur filter may be applied to give weight to the neighborhood of each pixel. If the feature type associated with the potentially aliased content is an edge, a one-dimensional five anti-antialiasing filter is applied to the input image. As discussed above the corrections are applied to the input image, or the image to be downscaled, prior to any down sampling or post processing filters. At block 506, the corrected image is downscaled according to the scale factor.

This process flow diagram is not intended to indicate that the blocks of the example method 500A are to be executed in any particular order, or that all of the blocks are to be included in every case. Further, any number of additional blocks not shown may be included within the example method 500A, depending on the details of the specific implementation.

Figure 5B:
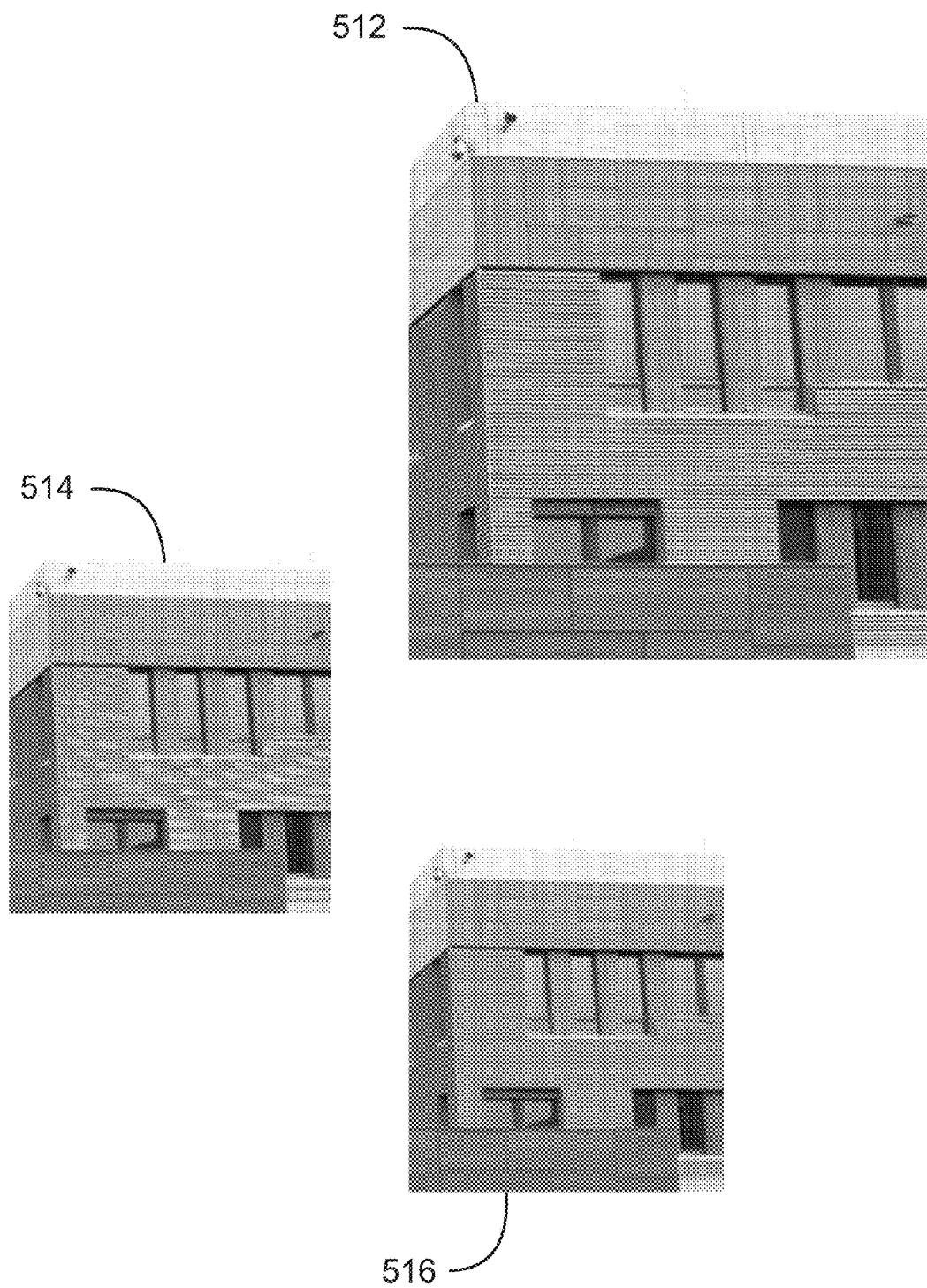
FIG. 5B is an illustration of a series of images.

FIG. 5B is a series of images 500B. The image 512 is an input image. Areas with potentially aliased content are determined in the input image based on the scale factor. These areas may be, for example, the siding on the building in the input image 512. The siding includes multiple horizontal lines that may be aliased when downscaled, as illustrated in the downscaled output 514. The content based anti-aliasing as described herein is illustrated by the output image 516. In the output image 516, aliasing near the siding in image 516 is substantially reduced or eliminated.

Figure 6:
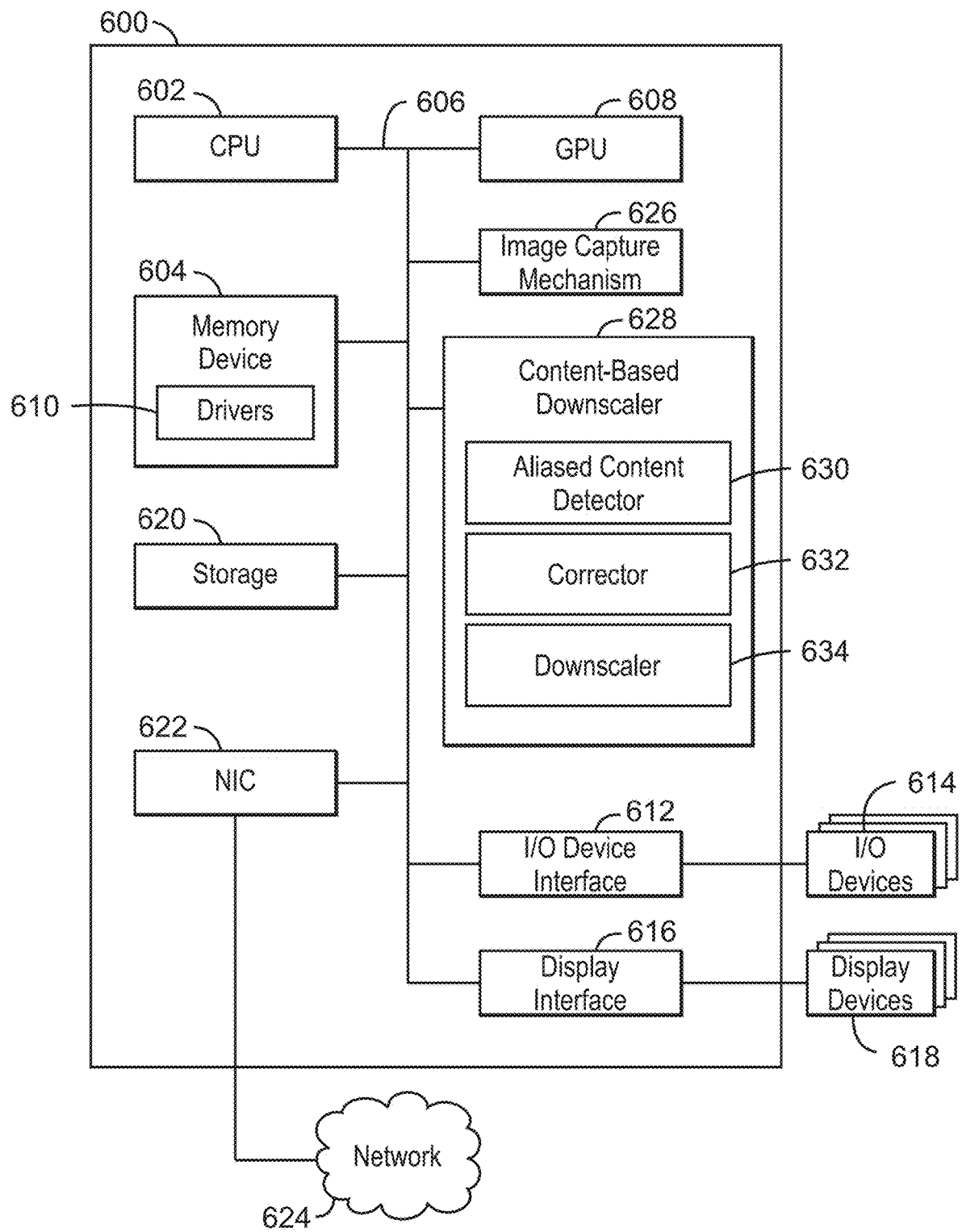
FIG. 6 is a block diagram of a system that enables content based anti-aliasing for image downscale.

Referring now to FIG. 6, a block diagram is shown of a system that enables content based anti-aliasing for image downscale. The computing device 600 may be, for example, a laptop computer, desktop computer, tablet computer, mobile device, or wearable device, among others. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random-access memory (DRAM). The memory may include drivers 610.

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a viewer of the computing device 600.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 616. The display devices 618 may include a display screen that is a built-in component of the computing device 600. The display devices 618 may also include a computer monitor, television, or projector, among others, that is internal to or externally connected to the computing device 600. The display device 616 may also include a head mounted display.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a plurality of image capture mechanisms 626. The image capture mechanisms 626 may be configured to capture images. In embodiments, the image capture mechanisms 626 are positioned to capture a volumetric space and are communicatively coupled with the computing device 600.

The computing device 600 includes a content-based downscaler 628. The content-based downscaler 628 includes an aliased-content detector 630, a corrector 632, and a downscaler 634. The aliased-content detector 630 is configured to detect potentially aliased content in an input image. The detection of potentially aliased content may be based, in part on a scale factor between the input image and the target image. The corrector 632 is configured to apply one or more corrections to the potentially aliased content of the input image based on a feature type corresponding to the potentially aliased content. The downscaler 634 is configured to downscale the corrected image is according to the scale factor.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the content-based downscaler 628, aliased-content detector 630, corrector 632, and downscaler 634 may be partially, or entirely, implemented in hardware and/or in the processor 602. For example, the functionality may be implemented with an application specific integrated circuit, in logic implemented in the processor 602, or in any other device. For example, the functionality of the content-based downscaler 628 may be implemented with an application specific integrated circuit, in logic implemented in a processor, in logic implemented in a specialized graphics processing unit such as the GPU 608, or in any other device.

Figure 7:
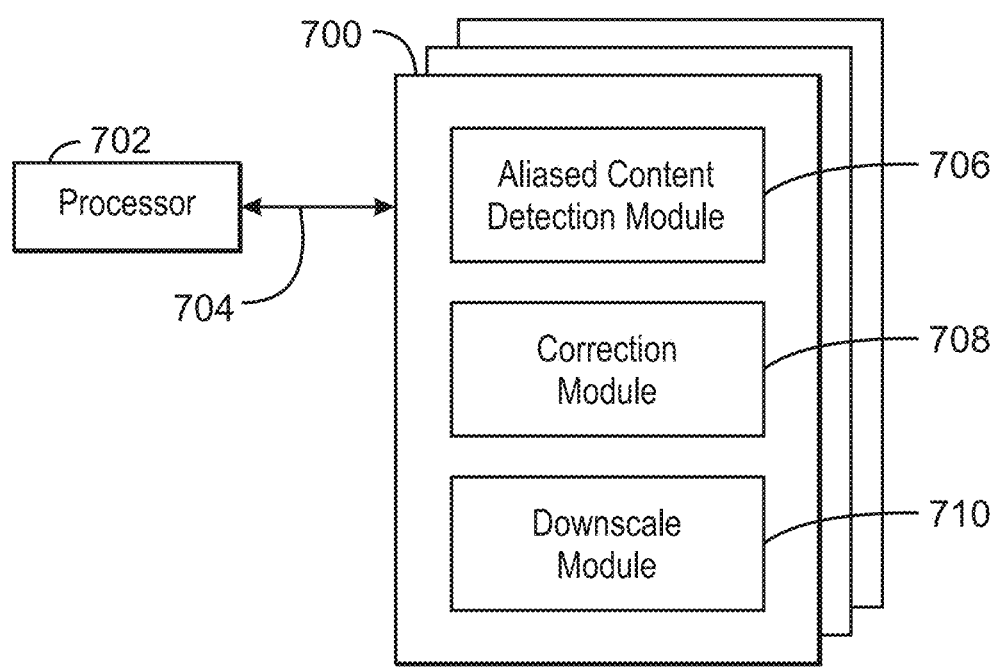
FIG. 7 is a block diagram showing computer readable media that stores code for content based anti-aliasing for image downscale.

FIG. 7 is a block diagram showing computer readable media 700 that stores code for content based anti-aliasing for image downscale. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, an aliased-content detection module 706 may be configured to detect potentially aliased content in an input image. The detection of potentially aliased content may be based, in part on a scale factor between the input image and the target image. A correction module 708 may be configured to apply one or more corrections to the potentially aliased content of the input image based on a feature type corresponding to the potentially aliased content. A downscale module 710 may be configured to downscale the corrected image is according to the scale factor.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for content based anti-aliasing. The apparatus includes a detector to detect potential aliased content in an input image, wherein the potentially aliased content occurs at a downscaled version of the input image. A corrector is to apply a correction to a single component of the input image.

Example 2 includes the apparatus of example 1, including or excluding optional features. In this example, the apparatus includes a downscaler to downscale the corrected input image to an output image according to a scaling factor.

Example 3 includes the apparatus of any one of examples 1 to 2, including or excluding optional features. In this example, the potentially aliased content is determined based on the scale factor.

Example 4 includes the apparatus of any one of examples 1 to 3, including or excluding optional features. In this example, the potentially aliased content of the input image corresponds to transitions and edges detected in the input image.

Example 5 includes the apparatus of any one of examples 1 to 4, including or excluding optional features. In this example, a pixel of content is potentially aliased content if a number of transitions computed in a direction are greater than an edge count for a neighborhood of pixels.

Example 6 includes the apparatus of any one of examples 1 to 5, including or excluding optional features. In this example, a pixel of content is aliased if a number of transitions computed in a direction are greater than an edge count, wherein pixel differences are computed for each direction in a neighborhood of pixels, and in response to the number of pixels being greater than an intensity threshold, identifying the pixels with differences as a transition.

Example 7 includes the apparatus of any one of examples 1 to 6, including or excluding optional features. In this example, when the potentially aliased content corresponds to a transition feature type, applying a Gaussian blur filter for correction.

Example 8 includes the apparatus of any one of examples 1 to 7, including or excluding optional features. In this example, when the potentially aliased content does not correspond to a transition feature type and the potentially aliased content corresponds to an edge feature type, wherein the edge feature type is detected by performing edge detection wherein for every pixel which is not an aliased pixel, convolve the 3×3 neighborhood of input pixels with each of the 4 Sobel matrices to compute 4 resulting Sobel values.

Example 9 includes the apparatus of any one of examples 1 to 8, including or excluding optional features. In this example, in response to the potentially aliased content corresponding to an edge feature type, determining an edge direction that is greater than an edge threshold to determine an identified winning direction.

Example 10 includes the apparatus of any one of examples 1 to 9, including or excluding optional features. In this example, the single component of the image is a luminance component.

Example 11 is a method for content based anti-aliasing. The method includes detecting potential aliased content in an input image, wherein the potentially aliased content occurs at a downscaled version of the input image; applying a correction to a single component of the input image; and downscaling the corrected input image to an output image according to a scaling factor.

Example 12 includes the method of example 11, including or excluding optional features. In this example, the potentially aliased content is determined based on the scale factor.

Example 13 includes the method of any one of examples 11 to 12, including or excluding optional features. In this example, the potentially aliased content of the input image corresponds to transitions and edges detected in the input image.

Example 14 includes the method of any one of examples 11 to 13, including or excluding optional features. In this example, a pixel of content is potentially aliased content if a number of transitions computed in a direction are greater than an edge count for a neighborhood of pixels.

Example 15 includes the method of any one of examples 11 to 14, including or excluding optional features. In this example, a pixel of content is aliased if a number of transitions computed in a direction are greater than an edge count, wherein pixel differences are computed for each direction in a neighborhood of pixels, and in response to the number of pixels being greater than an intensity threshold, identifying the pixels with differences as a transition.

Example 16 includes the method of any one of examples 11 to 15, including or excluding optional features. In this example, when the potentially aliased content corresponds to a transition feature type, applying a Gaussian blur filter for correction.

Example 17 includes the method of any one of examples 11 to 16, including or excluding optional features. In this example, when the potentially aliased content does not correspond to a transition feature type and the potentially aliased content corresponds to an edge feature type, wherein the edge feature type is detected by performing edge detection wherein for every pixel which is not an aliased pixel, convolve the 3×3 neighborhood of input pixels with each of the 4 Sobel matrices to compute 4 resulting Sobel values.

Example 18 includes the method of any one of examples 11 to 17, including or excluding optional features. In this example, in response to the potentially aliased content corresponding to an edge feature type, determining an edge direction that is greater than an edge threshold to determine an identified winning direction.

Example 19 includes the method of any one of examples 11 to 18, including or excluding optional features. In this example, the single component of the image is a luminance component.

Example 20 includes the method of any one of examples 11 to 19, including or excluding optional features. In this example, the downscaling the input image comprises downsampling the corrected image and applying anti-aliasing post-processing.

Example 21 is at least one computer readable medium for content based anti-aliasing having instructions stored therein that. The computer-readable medium includes instructions that direct the processor to detect potential aliased content in an input image, wherein the potentially aliased content occurs at a downscaled version of the input image; and apply a correction to a single component of the input image; and Example 22 includes the computer-readable medium of example 21, including or excluding optional features. In this example, the computer-readable medium includes downscaling the corrected input image to an output image according to a scaling factor.

Example 23 includes the computer-readable medium of any one of examples 21 to 22, including or excluding optional features. In this example, the potentially aliased content is determined based on the scale factor.

Example 24 includes the computer-readable medium of any one of examples 21 to 23, including or excluding optional features. In this example, the potentially aliased content of the input image corresponds to transitions and edges detected in the input image.

Example 25 includes the computer-readable medium of any one of examples 21 to 24, including or excluding optional features. In this example, a pixel of content is potentially aliased content if a number of transitions computed in a direction are greater than an edge count for a neighborhood of pixels.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for content based anti-aliasing, the apparatus comprising:
   interface circuitry;
   instructions; and
   processor circuitry to execute the instructions to:
      compute pixel differences for a neighborhood of pixels in an input image, the pixel differences computed in a direction;
      identify ones of the pixel differences as transitions based on a threshold;
      detect potentially aliased content in the input image based on comparison of a number of the transitions to an edge count, the potentially aliased content classified as having a potential to be aliased in a downscaled version of the input image; and
      obtain a corrected input image by application of a correction to a single component of the potentially aliased content detected in the input image.

2. The apparatus of claim 1, wherein the processor circuitry is to downscale the corrected input image to an output image according to a scaling factor.

3. The apparatus of claim 2, wherein the processor circuitry is to detect the potentially aliased content based on the scale factor.

4. The apparatus of claim 1, wherein the potentially aliased content is detected when the number of the transitions in the direction is greater than the edge count.

5. The apparatus of claim 1, wherein when the potentially aliased content corresponds to a transition feature type, the processor circuitry is to apply a Gaussian blur filter as the correction.

6. The apparatus of claim 1, wherein when the potentially aliased content does not correspond to a transition feature type and the potentially aliased content corresponds to an edge feature type, the processor circuitry is to detect the edge feature type by performing edge detection for a pixel not classified as a potentially aliased pixel, the edge detection including convolution of a 3×3 neighborhood of input pixels with each of four Sobel matrices to compute four resulting Sobel values.

7. The apparatus of claim 1, wherein in response to the potentially aliased content corresponding to an edge feature type, the processor circuitry is to determine an edge direction that is greater than an edge threshold to determine an identified winning direction.

8. The apparatus of claim 1, wherein the single component of the input image is a luminance component.

9. A method for content based anti-aliasing, the method comprising:
   computing pixel differences for a neighborhood of pixels in an input image, the pixel differences computed in a direction;
   identifying ones of the pixel differences as transitions based on a threshold;
   detecting potentially aliased content in an input image based on comparison of a number of the transitions to an edge count, the potentially aliased content classified as having a potential to be aliased in a downscaled version of the input image;
   applying a correction to a single component of the potentially aliased content detected in the input image to obtain a corrected input image; and
   obtaining an output image by downscaling the corrected input image according to a scaling factor.

10. The method of claim 9, wherein the potentially aliased content is determined based on the scale factor.

11. The method of claim 9, wherein the potentially aliased content is detected when the number of the transitions in the direction is greater than the edge count.

12. The method of claim 9, wherein when the potentially aliased content corresponds to a transition feature type, the applying of the correction includes applying a Gaussian blur filter as the correction.

13. The method of claim 9, wherein when the potentially aliased content does not correspond to a transition feature type and the potentially aliased content corresponds to an edge feature type, the detecting of the potentially aliased content includes detecting the edge feature type by performing edge detection for a pixel not classified as a potentially aliased pixel, the edge detection including convolving a 3×3 neighborhood of input pixels with each of four Sobel matrices to compute four resulting Sobel values.

14. The method of claim 9, wherein in response to the potentially aliased content corresponding to an edge feature type, the detecting of the potentially aliased content includes determining an edge direction that is greater than an edge threshold to determine an identified winning direction.

15. The method of claim 9, wherein the single component of the input image is a luminance component.

16. The method of claim 9, wherein the downscaling the input image includes downsampling the corrected input image and applying anti-aliasing post-processing.

17. At least one article of manufacture comprising instructions to cause a computing device to at least:
   compute pixel differences for a neighborhood of pixels in an input image, the pixel differences computed in a direction;
   identify ones of the pixel differences as transitions based on a threshold;
   detect potentially aliased content in the input image based on comparison of a number of the transitions to an edge count, the potentially aliased content classified as having a potential to be aliased in a downscaled version of the input image; and obtain a corrected input image by application of a correction to a single component of the potentially aliased content detected in the input image.

18. The at least one article of manufacture of claim 17, wherein the instructions are to cause the computing device to downscale the corrected input image to an output image according to a scaling factor.

19. The at least one article of manufacture of claim 18, wherein the instructions are to cause the computing device to detect the potentially aliased content based on the scale factor.

20. The at least one article of manufacture of claim 17, wherein the potentially aliased content is detected when the number of the transitions in the direction is greater than the edge count.

21. The at least one article of manufacture of claim 17, wherein when the potentially aliased content corresponds to a transition feature type, the instructions are to cause the computing device to apply a Gaussian blur filter as the correction.

22. The at least one article of manufacture of claim 17, wherein when the potentially aliased content does not correspond to a transition feature type and the potentially aliased content corresponds to an edge feature type, the instructions are to cause the computing device to detect the edge feature type by performing edge detection for a pixel not classified as a potentially aliased pixel, the edge detection including convolution of a 3×3 neighborhood of input pixels with each of four Sobel matrices to compute four resulting Sobel values.

23. The at least one article of manufacture of claim 17, wherein in response to the potentially aliased content corresponding to an edge feature type, the instructions are to cause the computing device to determine an edge direction that is greater than an edge threshold to determine an identified winning direction.

24. The at least one article of manufacture of claim 17, wherein the single component of the input image is a luminance component.

* * * * *